United States Patent [19]
Lloyd

[11] Patent Number: 5,892,306
[45] Date of Patent: Apr. 6, 1999

[54] METHOD AND APPARATUS FOR BALANCING A LOAD WITH A SALIENT POLE ROTOR MACHINE

[75] Inventor: Jerry D. Lloyd, Florissant, Mo.

[73] Assignee: Emerson Electric Co., St. Louis, Mo.

[21] Appl. No.: 823,192

[22] Filed: Mar. 24, 1997

[51] Int. Cl.[6] .................................................. H02K 5/24
[52] U.S. Cl. .............................. 310/51; 310/43; 310/44; 310/81; 310/269; 73/1.113; 73/1.114
[58] Field of Search ................................ 310/269, 81, 43, 310/44, 51; 73/1.113, 1.114; 29/295

[56] References Cited

U.S. PATENT DOCUMENTS

| | | | |
|---|---|---|---|
| 2,232,773 | 2/1941 | Daiger | 310/51 |
| 2,316,635 | 4/1943 | Staak | 310/51 |
| 3,657,582 | 4/1972 | Phelon | 310/156 |
| 3,659,129 | 4/1972 | Pettersen | 310/216 |
| 3,943,391 | 3/1976 | Fehr | 310/103 |
| 3,995,203 | 11/1976 | Torok | 318/166 |
| 4,469,970 | 9/1984 | Neumann | 310/156 |
| 4,916,346 | 4/1990 | Kliman | 310/216 |
| 4,918,831 | 4/1990 | Kliman | 29/598 |
| 5,023,502 | 6/1991 | Johnson | 310/261 |
| 5,045,742 | 9/1991 | Armstrong et al. | 310/254 |
| 5,053,666 | 10/1991 | Kliman et al. | 310/261 |
| 5,111,096 | 5/1992 | Horst | 310/168 |
| 5,166,569 | 11/1992 | Shervington et al. | 310/261 |
| 5,282,309 | 2/1994 | La Rue | 29/736 |
| 5,300,845 | 4/1994 | Fanning et al. | 310/217 |
| 5,323,080 | 6/1994 | Shahamat et al. | 310/261 |
| 5,554,900 | 9/1996 | Pop, Sr. | 310/156 |
| 5,666,015 | 9/1997 | Uchibori et al. | 310/261 |
| 5,724,862 | 3/1998 | Hannah et al. | 74/573 R |

FOREIGN PATENT DOCUMENTS

| | | | |
|---|---|---|---|
| 0 157 526 | 6/1990 | European Pat. Off. | H02K 19/24 |
| 0 668 652 | 8/1995 | European Pat. Off. | H02K 19/10 |
| 6-62540 | 3/1994 | Japan | H02K 1/24 |
| 1114562 | 5/1968 | United Kingdom | H02K 1/02 |
| 2 172 443 | 9/1986 | United Kingdom | H02K 1/28 |

OTHER PUBLICATIONS

*Soviet Inventions Illustrated*, Week 8829, Aug. 31, 1988 (English Abstract).

A. J. Hutton and T. J. E. Miller, "Use of Flux Screens in Switched Reluctance Motors," pp. 312–316, Proc. EMD, Sep. 1989, London.

Stephenson and Blake, "The Characteristics, Design and Applications of Switched Reluctance Motors and Drives," PCIM Conference & Exhibition, Jun. 21–24, 1993, Nuremberg, Germany.

*Primary Examiner*—Nestor Ramirez
*Assistant Examiner*—Thanh Lam
*Attorney, Agent, or Firm*—Arnold, White & Durkee

[57] ABSTRACT

This invention provides a method and apparatus for balancing a system including a salient pole rotor machine and an off-balance load. The illustrative embodiment of this invention provides a method and apparatus for balancing the system by positioning a balancing compound between the poles of the rotor of the machine.

14 Claims, 5 Drawing Sheets ent invention relates to a method and apparatus for balancing a system including a salient pole rotor and an off-balance load coupled to the rotor of the machine.

METHOD AND APPARATUS FOR BALANCING A LOAD WITH A SALIENT POLE ROTOR MACHINE

FIELD OF THE INVENTION

This invention relates to a method and apparatus for balancing a system including a salient pole rotor and an off-balance load coupled to the rotor of the machine.

BACKGROUND OF THE INVENTION

Frequently, a salient pole rotor machine is used to drive a load that is not balanced with respect to the rotor's axis of rotation, such as a compressor. Proper balancing of the load can improve a machine's performance, reduce a machine's operating noise, and extend a machine's operating life.

Conventional salient pole rotor machines, such as switched reluctance machines or synchronous reluctance machines, contain a rotor which rotates continuously. If the mass of the load being driven by the machine is unevenly distributed relative to the axis of rotation, then the system may wobble and vibrate as the rotor rotates. Besides producing noise, this excess motion causes the machine to operate less efficiently. In addition, these structural vibrations can cause fatigue in the machine's components and in any structure coupled to the rotor, and this wear-and-tear may result in premature deterioration or reduced life of the machine.

Current methods of balancing the load on these machines typically involve coupling a weight out board to the rotor shaft with a screw, pin, or other means, with the weight being positioned such that it counterbalances the off-balance load on the machine. The weight will typically abut the rotor, although it may be spaced apart from the rotor as well. By coupling an additional weight to the shaft, these processes can result in a system that is larger and therefore more problematic. Adding weight to the shaft can produce a machine that is larger, a compressor that is therefore taller, and a larger distance between bearings. Because a rotor in a salient pole rotor machine is subjected to significant normal forces during operation, these longer distances will cause the shaft to deform further during operation and thereby produce a noisier machine. In addition, wear on the machine components is increased. Thus, to date, efforts to resolve the problem of balancing a load in a salient pole rotor machine have proven inadequate.

This invention provides a simple, efficient means of balancing a load in a salient pole rotor machine without these complications.

SUMMARY OF THE INVENTION

In accordance with one aspect of the present invention, there is provided a method of balancing a system having an off-balance load and a salient pole rotor machine having a rotor, the method comprising the act of positioning a balancing compound in the interpole region of the rotor.

In accordance with another aspect of the present invention, there is provided a salient pole rotor machine system comprising a rotor coupled to a rotor shaft, an off-balance load coupled to the rotor shaft, and a balancing compound positioned in the interpole region of the rotor to offset the off-balance load.

In accordance with still another aspect of the present invention, there is provided a salient pole rotor machine system comprising a rotor coupled to a rotor shaft, an off-balance load coupled to the rotor shaft, and a weight coupled to the rotor shaft adjacent the rotor, with a portion of the weight extending into the interpole region of the rotor to offset the off-balance load.

Other aspects of the present invention will be apparent to one of ordinary skill in the art having the benefit of this disclosure.

BRIEF DESCRIPTION OF THE DRAWINGS

The accompanying drawings illustrate a few of the various ways to practice this invention.

DESCRIPTION OF ILLUSTRATIVE EMBODIMENTS

Figure 1:
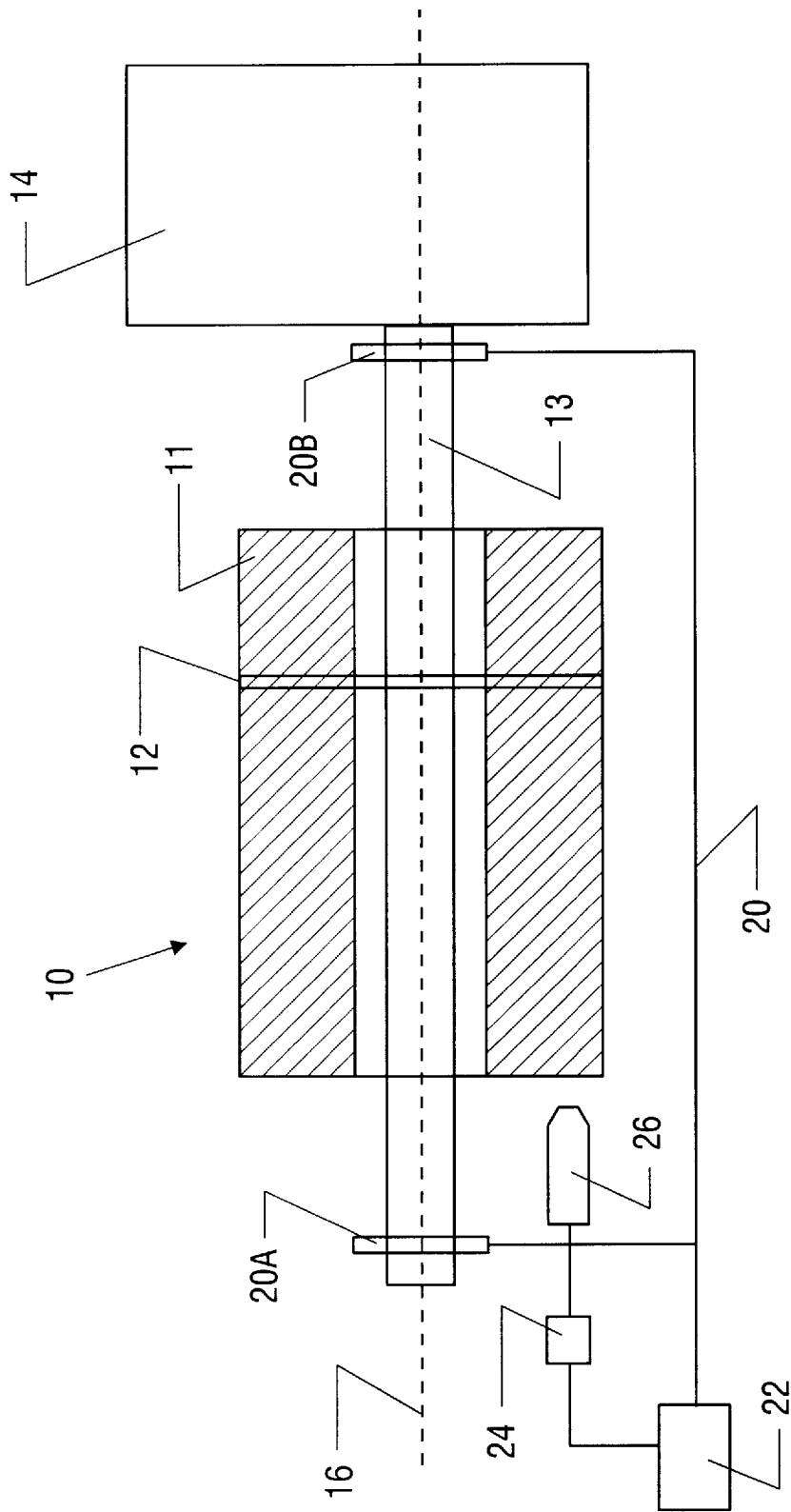
FIG. 1 displays the length of a salient pole rotor machine coupled to an off-balance load.

Turning to the drawings and, in particular, to FIG. 1, an apparatus for balancing a system including a salient pole rotor machine and an off-balance load according to the present invention is illustrated.

In general, a rotor 10 is provided that, in the exemplary embodiment, comprises a stack 11 of substantially identical rotor laminations 12 that is mounted to a rotor shaft 13. The construction of the rotor 10, including the construction of the rotor stack 11, the shaft 13, and the mounting of the stack 11 on the shaft 13 may be conventional. The shaft 13 is also coupled to a load 14, which will typically be unbalanced with respect to the axis of rotation 16.

Figure 2:
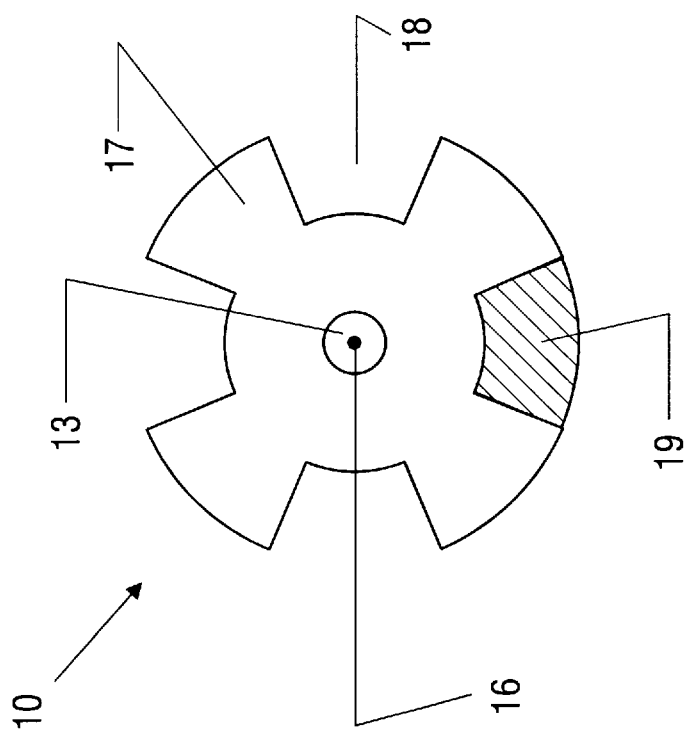
FIG. 2 displays the end of the rotor of a salient pole rotor machine with a balancing compound formed between two rotor poles.

FIG. 2 presents an end view of rotor 10. In this embodiment, rotor 10 has four substantially identical salient poles 17, which define four regions 18 between the poles, also called interpole regions. In order to balance an off-balance load, a balancing compound 19 is formed in one or more of the interpole regions 18, such that the overall system is balanced about the axis of rotation 16. Because the interpole regions 18 will typically be small with respect to the system as a whole, balancing compound 19 must be formed of a material dense enough to counterbalance the unbalanced load, and is preferably formed of zinc. However, this purpose may be fulfilled by another metal or metal alloy, such as brass or aluminum, and assuming sufficient density, any other suitable material could be used, such as plastic or ceramic. The balancing compound should be formed from a non-active material (e.g., non-paramagnetic and non-magnetic) so that it does not appreciably affect the operation of the machine in which it is formed.

Referring again to FIG. 1, the combination of the rotor 10 and the load 14 may be placed in an appropriate balancing apparatus 20, reflected by rotor shaft mounts 20A and 20B, that spins the system and detects any imbalances. Balancing devices along these lines are generally known in the art and the construction of such a device should be within the ability of one of ordinary skill in the art having the benefit of this disclosure.

The output of the balancing apparatus 20 may be provided to a main processor 22 such as a programmed processor of a specially programmed controller. The processor 22 may receive the imbalance information from apparatus 20 and provide control signals to controller 24 which in turn is coupled to material addition tool 26. According to one method of the present invention, the rotor 10 is rotated at an appropriate speed and the apparatus 20 is used to detect imbalances in the system. The processor 22 detects these imbalances and provides control signals to the controller 24 which causes material addition tool 26 to form balancing compound 19 in one or more of the interpole regions 18.

Figure 3:
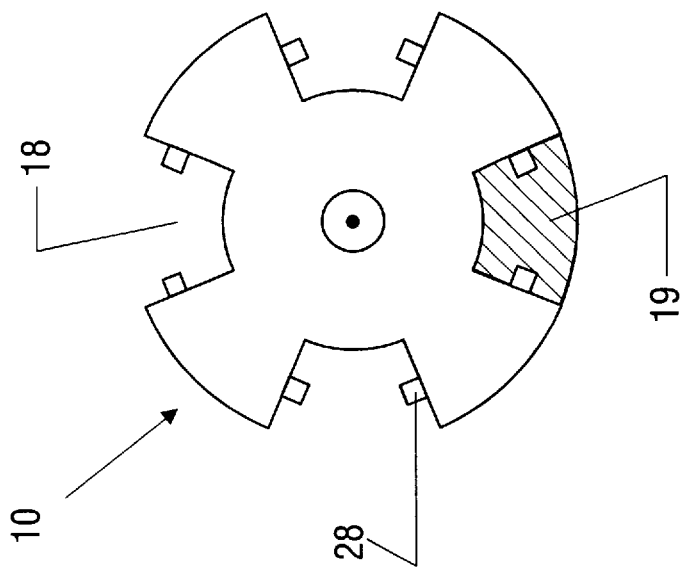
FIG. 3 illustrates a proposed lamination modification to retain a balancing compound at high r.p.m.'s.
Figure 4:
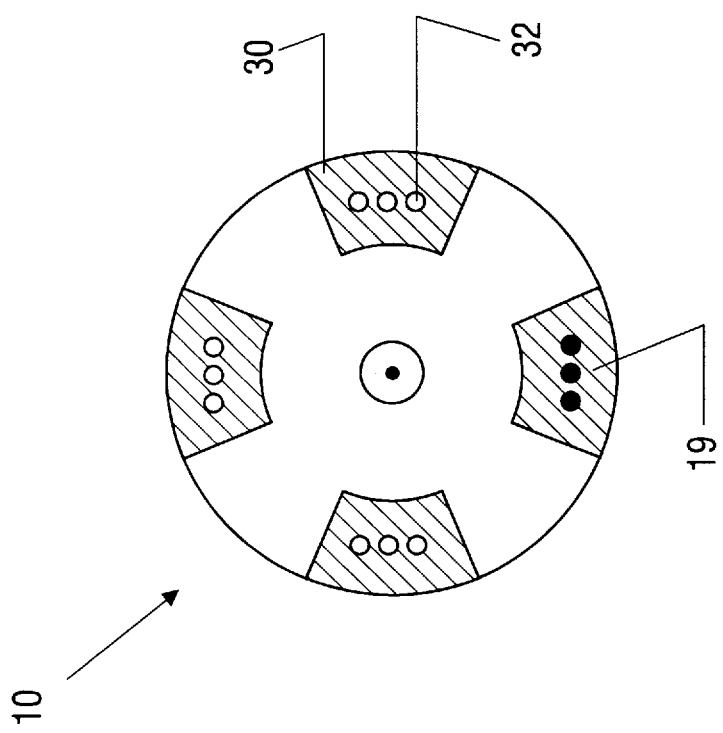
FIG. 4 illustrates a rotor having inserts formed in the interpole regions, to hold the balancing compound.

FIGS. 3–5 illustrate alternative embodiments for adding a balancing compound to the interpole regions 18 of rotor 10. FIG. 3 illustrates a proposed lamination modification to retain the balancing compound 19 at high r.p.m.'s. The walls of rotor 10 have a protuberance 28 to prevent the balancing compound 19 from becoming dislodged from rotor 10 during operation. This modification provides greater support against the balancing compound's inertia at high r.p.m.'s.

In FIG. 4, each interpole region 18 is filled with an insert 30, such that the outer surface of the rotor 10 is flush with the outer surface of inserts 30. Insert 30 might be formed, for example, of plastic, and molded to fill an entire interpole region 18. This approach is advantageous, in that by completely filling the interpole regions 18, the rotor 10 encounters less friction from the air, reducing both the noise of operation and windage losses. Each insert 30 in turn defines one or more slots 32, which are designed to hold balancing compound 19. Balancing compound 19 is inserted into one or more slots 32 to balance the load on the machine.

Figure 5A:
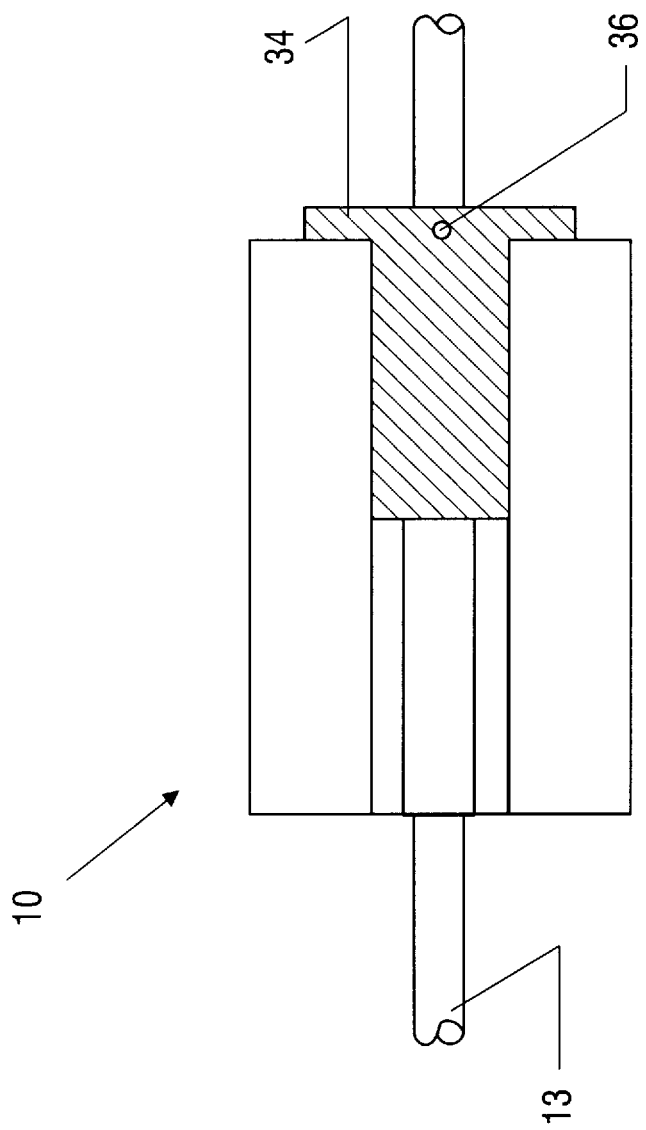
FIGS. 5a, 5b, and 5c illustrate a weight attached to an end of the rotor shaft adjacent the rotor, with a portion of the weight extending into the interpole region of the rotor.
Figure 5C:
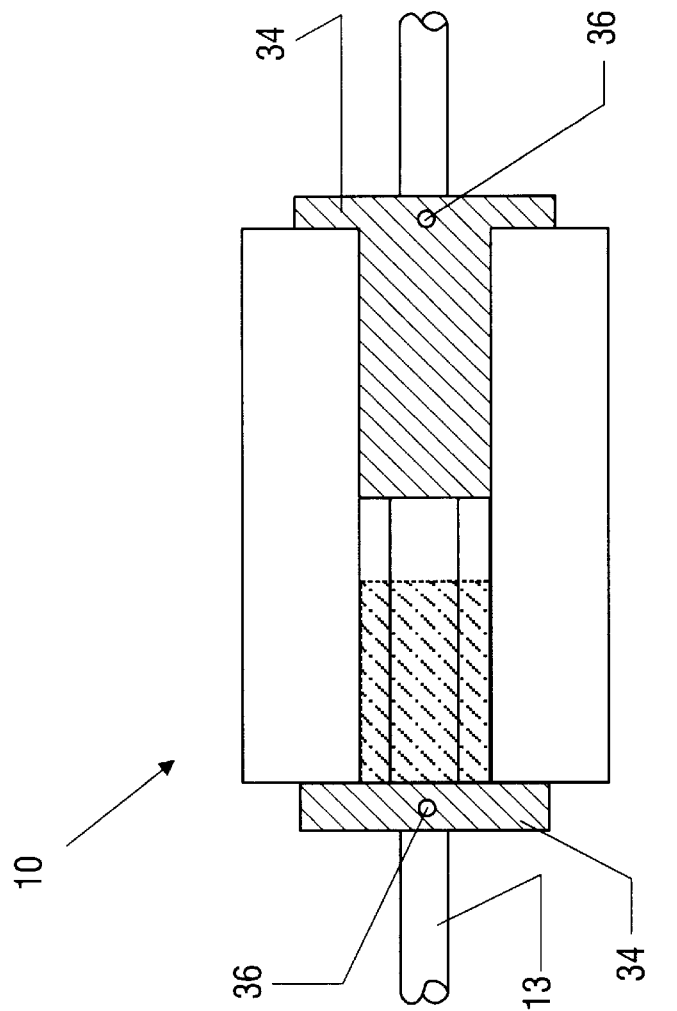
Figure 5B:
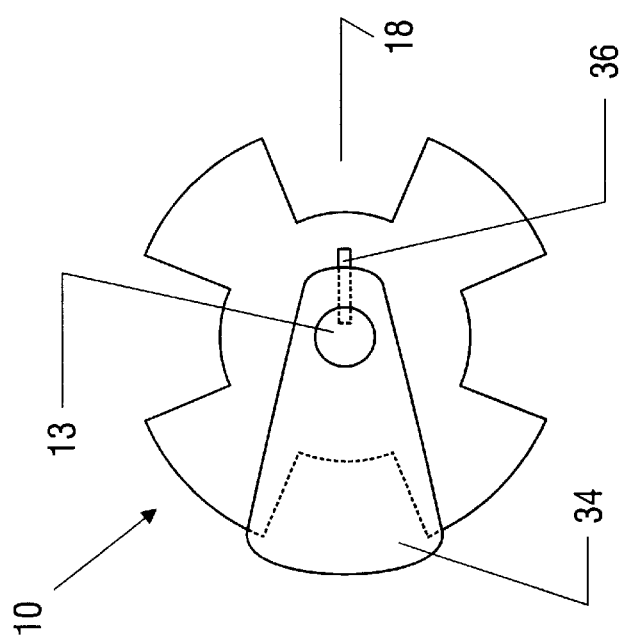

FIGS. 5a–5c illustrate yet another method for balancing the load on the machine. As shown in FIGS. 5a and 5b, a weight 34 is attached to shaft 13 by pin 36, adjacent rotor 10. A portion of weight 34 extends into one interpole region 18 of rotor 10, so as to balance the load on the machine. Weight 34 is typically a single die cast or molded part. Alternatively, as illustrated in FIG. 5c, the weight 34 could be placed at both ends of rotor 10, each attached to shaft 13 by a pin 36. A portion of each weight 34 extends into interpole regions on opposite sides of rotor 10, to produce a couple counterbalance. This method of producing a couple counterbalance can be used in conjunction with any of the foregoing methods, to achieve both static and dynamic balance.

Besides efficiently balancing the system, the material addition process offers numerous advantages. First, because material is added to the interpole region, the machine is not made larger by the balancing process, producing a quieter, more compact machine that undergoes less stress and fatigue during operation. Also, the process is easily reversible. Further, by partially or completely closing the interpole regions, the method reduces windage noise and windage losses.

Although the illustrative embodiments and related discussions describe various embodiments of this invention, the descriptions do not limit this invention; this invention is limited only by the spirit and scope of the following claims.

What is claimed is:

1. A salient pole rotor machine system comprising:
   a) a rotor coupled to a rotor shaft, the rotor defining interpole regions;
   b) an off-balance load coupled to the rotor shaft; and
   c) a balancing compound positioned in the interpole region of the rotor, the balancing compound adapted to offset the off-balance load.

2. The salient pole rotor machine system of claim 1, wherein the balancing compound is non-active material.

3. The salient pole rotor machine system of claim 1, wherein the balancing compound is a high density material.

4. The salient pole rotor machine system of claim 3, wherein the high density material is a member selected from the group consisting of zinc, brass, aluminum, plastic, and ceramic.

5. The salient pole rotor machine system of claim 1, further comprising an insert positioned in the interpole region of the rotor, the insert defining at least one slot, the balancing compound being positioned in the at least one slot.

6. The salient pole rotor machine system of claim 5, wherein the insert is formed of a plastic.

7. The salient pole rotor machine system of claim 5, wherein an outer surface of the insert is flush with an outer surface of the rotor.

8. The salient pole rotor machine system of claim 1, wherein the balancing compound is held in place by a protuberance from the rotor.

9. A salient pole rotor machine system comprising:
   a) a rotor coupled to a rotor shaft, the rotor defining interpole regions;
   b) an off-balance load coupled to the rotor shaft;
   c) a weight coupled to the rotor shaft adjacent the rotor, a portion of the weight extending into the interpole region of the rotor to offset the off-balance load.

10. The salient pole rotor machine system of claim 9, wherein the weight is a single molded part.

11. A salient pole rotor machine system comprising:
   a) a rotor coupled to a rotor shaft, the rotor defining interpole regions;
   b) an off-balance load coupled to the rotor shaft; and
   c) means for offsetting the off-balance load positioned in the interpole region of the rotor.

12. The salient pole rotor machine system of claim 11, wherein the means for offsetting the off-balance load is a balancing compound formed of a non-active material.

13. The salient pole rotor machine system of claim 11, wherein the means for offsetting the off-balance load is a balancing compound formed of a high density material.

14. The salient pole rotor machine system of claim 13, wherein the high density material is a member selected from the group consisting of zinc, brass, aluminum, plastic, and ceramic.

* * * * *